DELAY-TIME CONTROLLER EMPLOYING OUTPUT OF COMPARED DELAYED AND UNDELAYED REFERENCE SIGNAL AS DELAY-LINE CORRECTION SIGNAL

Filed Dec. 31, 1962

2 Sheets-Sheet 1

INVENTOR:
DAN GOOR,

BY Delbert P. Warner
HIS ATTORNEY.

Sept. 14, 1965 D. GOOR 3,206,686

DELAY-TIME CONTROLLER EMPLOYING OUTPUT OF COMPARED DELAYED AND UNDELAYED REFERENCE SIGNAL AS DELAY-LINE CORRECTION SIGNAL

Filed Dec. 31, 1962 2 Sheets-Sheet 2

INVENTOR:
DAN GOOR,

BY Delbert P. Warner
HIS ATTORNEY.

3,206,686

DELAY-TIME CONTROLLER EMPLOYING OUTPUT OF COMPARED DELAYED AND UNDELAYED REFERENCE SIGNAL AS DELAY-LINE CORRECTION SIGNAL

Dan Goor, Camillus, N.Y., assignor to General Electric Company, a corporation of New York Filed Dec. 31, 1962, Ser. No. 248,726
7 Claims. (Cl. 328—155)

This invention relates to means for providing controlled time delays to signals and in particular to means for providing greater precision and stability in time delay circuits.

Precise and stable control of time delay is necessary in many types of circuits. It is particularly important in radar circuits where precise control is required in order properly to process signals for such purposes as distinguishing between desired and undesired signals. The prior art devices have generally provided corrections to erroneous time delays produced by time delay lines by using feedback loops which control shifts in the phase or the frequency of the signal supplied to the delay line to compensate for errors in the delay time. Such prior art systems require large amounts of auxiliary equipment to provide the necessary correction and also cause a diminution of bandwidth with an attendant loss in resolution when the processed signals are used in visual display devices.

It is therefore an object of the present invention to provide improved means for controlling the time delay produced by delay lines on selected signals, It is a further object of this invention to provide improved delay time stability control, It is another object of this invention to eliminate the need for separate systems such as are now used to make up for time delay variations, It is still another object of this invention to provide a time delay control having greater precision than prior art systems, It is yet another object of this invention to provide improved delay line control while maintaining the bandwidth of the signal undiminished, It is still a further object of this invention to provide means which makes it possible to increase the amount of time a delay line is operational by decreasing its dependence on the warm-up time of an oven, It is yet a further object of this invention to make it possible to use cruder temperature controlling systems with systems employing AGC, It is another object of this invention to provide improved time delay means able to dispense with expensive temperature control devices.

Figure 1:
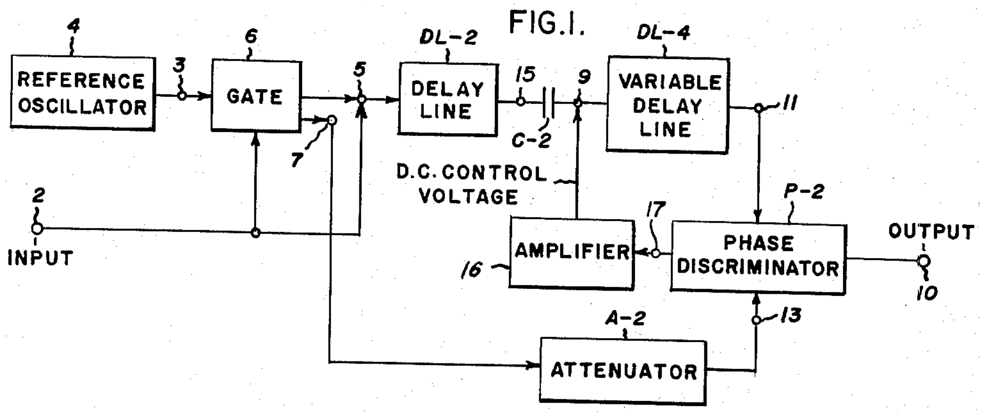
Figure 2:
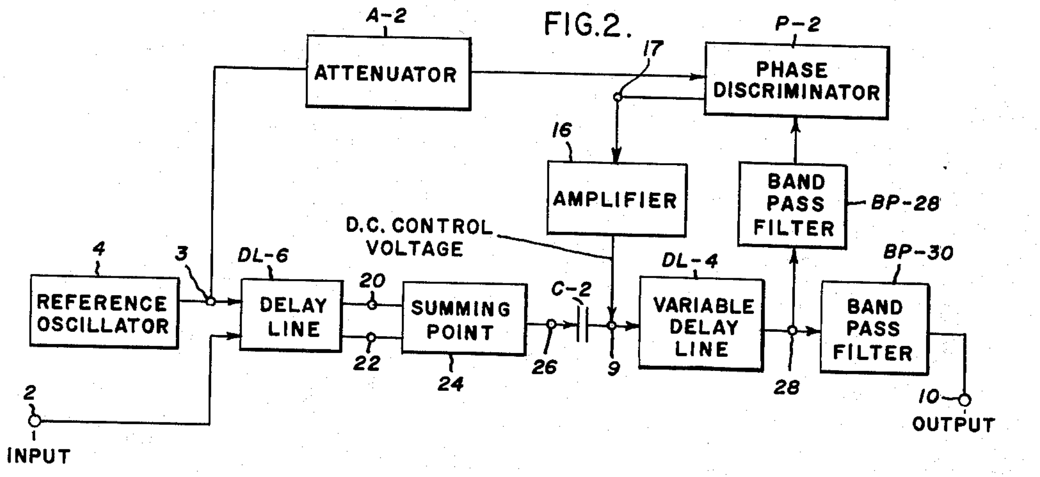
Figure 3:
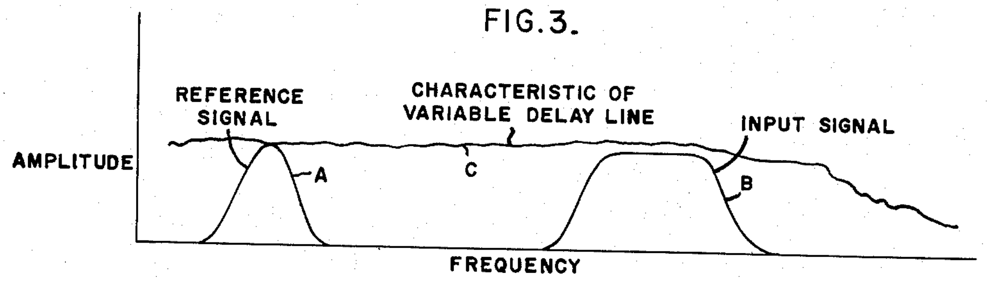
Figure 4:
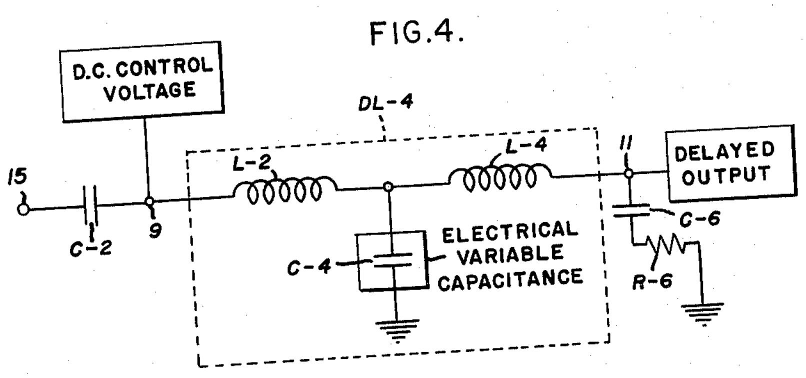
Figure 5:
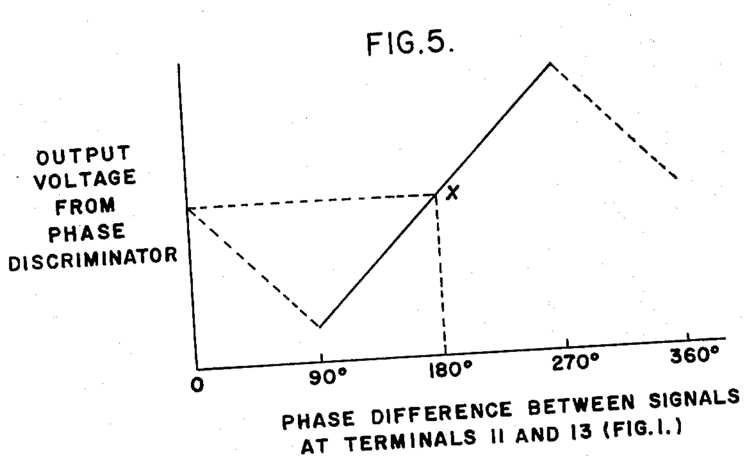
Figure 6:
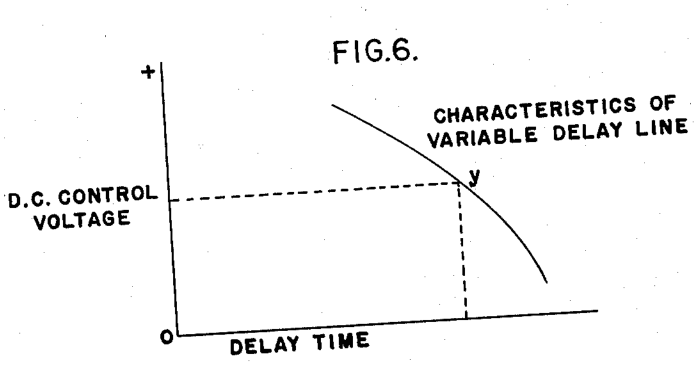

The novel features which I believe characterize the invention are set forth in the appended claims. The invention itself, however, together with further objects and advantages thereof, can best be understood by the following description taken in connection with the accompanying drawings in which:

FIG. 1 is a a block diagram illustrating a preferred embodiment of the invention, FIG. 2 is a block diagram illustrating another preferred embodiment of the invention, FIG. 3 is a drawing depicting characteristics of particular components used in the invention, FIG. 4 is a block diagram showing the nature of a critical component of the invention, FIG. 5 is a diagram illustrating the characteristics of a particular component of the invention, and FIG. 6 is a chart showing certain characteristics of a variable delay line employed in the present invention.

Briefly, the present invention attains the foregoing objects by use of a reference oscillator of great stability to generate reference signals which are used to control a variable delay line. The reference signals are supplied through a gate to two parallel circuits, the first of which includes a fixed temperature controlled delay line and a variable delay line in series while the second produces no delay. A delay nearly equal to the period of the reference signals is imposed on the signal in the first circuit by the series connected delay lines. A comparison of the phase relationships between the delayed signal and a succeeding signal which is not delayed, but which was transmitted over the second of said parallel circuits, is made in a phase discriminator. Since there is a phase shift of 360° over the first circuit and no phase shift over the second circuit, the delayed signal from the first circuit should be exactly in phase with the next reference signal which has arrived 360° later over the second circuit. If the two signals are not in phase the delay lines are not supplying exactly the right delay. When there is a difference in the phases of the two signals indicating incorrect delay, the phase discriminator supplies a D.C. control voltage proportional to the difference. This control voltage is used to vary the length of the variable delay line to produce the desired delay with great precision. Following the establishment of this precise delay in the series coupled delay lines, the circuit can provide this same precise delay to signals received from outside the system. This is done through the gate which upon receiving a signal from outside the system is made nonconducting while the received signal passes directly through the corrected delay lines.

Turning now to FIG. 1, we find an embodiment of the present invention which provides superior control of time delays by the use of accurately spaced signals from a reference oscillator such as is shown in block 4 and adjustable time delay devices such as are indicated at block DL–4. The reference oscillator 4 is a conventional oscillator designed to generate continuous waves or to generate pulses, but in either case to provide an output signal at a terminal 3 which may then be supplied to be used as a reference signal through a gate such as is indicated by block 6 in FIG. 1. The frequency of the oscillator is chosen so that the periods between peak signals from the oscillator are wave crests or pulses spaced the same distance apart as it is expected signals received via terminal 2 from outside the system will be spaced. The gate 6 is set initially so that it conducts signals applied at a terminal 3 and supplies them at output terminals 5 and 7. The signals on terminal 5 are provided through a delay line DL–2 to the delay line DL–4 which will provide a signal through a terminal 11 to a signal comparison device such as a phase discriminator of conventional design in block P–2 for comparison with other signals. The output signal appearing on terminal 7 of the gate is supplied through an attenuator A–2 and through a terminal 13 for comparison with signals from terminal 11 in the phase discriminator P–2.

The signals supplied from the reference oscillator 4 through the gate 6 are spaced with considerable precision, one uniform pulse repetition period or one wave period apart, and the delay line DL–2 in series with the variable delay line DL–4 is intended to produce a delay of the same length, therefore comparison in the phase discriminator should be between identical signals (or else between signals one of which has been shifted some exact number of degrees, such as 180°, out of phase by conventional circuits) and any discrepancy will be the result of imperfect timing in the delay line. The phase discriminator P–2 will provide a D.C. control voltage as illustrated in FIG. 5 in response to phase relationship of the two input signals and this D.C. control voltage will be supplied through an amplifier 16 to adjust the variable delay line to a condition such that it will increase or decrease the total delay to assure that the output signals supplied at terminal 10 are delayed with great precision and great stability for one pulse repetition period. From the foregoing it will be recognized that the reference oscillator 4 and the gate 6 and the attendant circuitry are designed to assure that the variable delay line DL–4 will provide a time delay such that the sum of the delays produced by DL–2 and DL–4 is adjusted to equal one pulse repetition period, regardless of variations in the delay lines due to temperature fluctuations and the like. The nature of the variable delay line used is explained in some detail in connection with FIG. 4.

With the variable delay line DL–4 properly adjusted, as explained in the last paragraph, a signal supplied at input terminal 2 which causes the gate 6 to stop transmitting signals from the reference oscillator 4 and to transmit signals between terminal 2 and terminal 5 instead will be accurately delayed by DL–2 and DL–4 for a time period within a small desired margin of error. The input signal supplied in FIG. 1 at terminal 2 is generally expected to be in the form of pulses such as may be expected as outputs from the IF circuits of a radar receiver, but may be a continuous waveform. This input signal will be supplied to the gate 6 and to the delay line DL–2, the condenser C–2 and the variable delay line DL–4 to the phase discriminator P–2. The gate 6 is designed not to transmit a signal to terminals 5 or 7 when the gate is activated by signals on terminal 2. The phase discriminator P–2 cannot make a comparison between signals from DL–4 and the attenuator A–2 at this time, since no signals are available from A–2. Under these circumstances, the phase discriminator is designed to supply an output signal on the output terminal 10 like the input signal at terminal 2, except that the output signal will be delayed in time by a selected amount in accordance with the delay established by the reference signal when it caused the variable delay line DL–4 to be set to a particular corrected delay.

Turning now to FIG. 2, an additional embodiment of the invention is shown which may be used to maintain continuous monitoring of the variable delay line. In FIG. 2 similar components are referred to by the same numbers as in FIG. 1. Considering first the part of the circuit in FIG. 2 which maintains the time delay at a constant value, we see a reference oscillator 4 which may produce output pulses having a constant pulse repetition rate or a continuous wave form of constant frequency. This reference oscillator in a particular case may be controlled by crystals or other means to provide a very stable output signal.

The signal from the reference oscillator 4 will be supplied to a terminal 3 and from there through divergent lines to an attenuator A–2 and a delay line DL–6 which is of different construction then delay line DL–2 of FIG. 1. As before, the attenuator A–2 will assure that the undelayed reference signal has the same amplitude relationship as the signal from the delay lines DL–6 and DL–4. In this case the delay line DL–6 will preferably be a conventional fused quartz or fused silica delay line which is cut in such a way as to provide two delay paths with the same delay time, one of which functions at the frequency of the signal supplied by reference oscillator 4 and the other of which is set to operate at a frequency corresponding to the frequency of the input signal supplied at terminal 2. The nature of this relationship may be seen in the curves plotted in FIG. 3 where the characteristics of the delay line DL–6 corresponding to curves A and B of the figure and of the variable delay line DL–4 corresponding to curve C are plotted. Having two channels, delay line DL–6 has two output terminals 20 and 22 which carry distinct signals separated in frequency as indicated in FIG. 3.

The output signals from the terminals 20 and 22 are connected to a summing point indicated by block 24, which channels both signals into the single terminal 26. The signals will then be supplied from terminal 26 through the condenser C–2 to a terminal 9 and to the variable delay line DL–4. The variable delay line DL–4 has characteristics, which are shown in FIG. 3 as curve C, such that it will pass both the reference signal and the input signal to a terminal 28. The signal on terminal 28 will then pass through a bandpass filter BP–28 which can pass only signals having a bandwidth corresponding to that of the reference signal. The signal from the bandpass filter BP–28 is supplied to the processor or phase discriminator indicated at P–2 for processing with the undelayed signal supplied from the attenuator A–2. The processor P–2 compares the phase relationship of the two input signals and operates as an electronic servo supplying a D.C. control voltage (see FIG. 5) through an isolating amplifier 16 to terminal 9. The D.C. control voltage in turn will control the delay produced by the variable delay line DL–4 in the manner previously described.

The D.C. control voltage supplied to the variable delay line DL–4 adjusts the time delay of the reference signal as indicated and thus makes available a way to correctly adjust the time delay imparted to other signals. The variable delay line DL–4 is able to control the amount of delay provided to any input signal with great precision and great stability. The signal supplied from the variable delay line to the terminal 28 may in a particular case be applied directly as the output signal of the circuit illustrated. However, improved performance is made possible by the addition of a band-pass filter such as BP–30 which can be made to pass only a band of signals of the same bandwidth and frequency as the input signals, as indicated in curve B of FIG. 3. This output signal may be supplied at a terminal 10 as shown in FIG. 2.

The characteristics of the delay lines referred to in FIG. 2 are shown in a general way in FIG. 3. In FIG. 3 amplitude is shown plotted as the ordinate and frequency is plotted as the abscissa. It will be understood that the frequency range represented will be determined by the needs of the system and the bandwidth which may be transmitted through the delay lines. All that is required for this system to function is that the reference signal be separated from the input signal by sufficient difference in frequency so that there is no interference between one and the other. The two delay channels are compensated to allow for the same delay time for both frequencies, this is done by putting a step where one or the other of the transducers couples to the delay line. As has been indicated previously, the delay line DL–6 is of such a nature that it supplies the reference signal and the input signal through separate or dual channels such that they are transmitted in the system through separate transducers and thus are maintained with a suitable separation in frequency. Having been delayed and kept separate in frequency the input signals and the reference signals are then added and transmitted to the variable delay line DL–4 which, as indicated in the response of the variable delay line in the curve of FIG. 3, transmits signals occurring over both ranges of frequency.

FIG. 4 illustrates a variable delay line DL–4 such as is indicated in FIG. 1 coupled between terminals 9 and 11. In FIG. 4 the signals to be delayed are applied at a terminal 15 and through a capacitor C–2 which is supplied to isolate D.C. signals to the terminal 9. The terminal 9 also receives a D.C. control voltage as indicated in FIG. 1. The combined signals supplied at terminal 9 appear across the coils L–2 and L–4 of the delay line DL–4 and across the electrical variable capacitance C–4. The output of DL–4 is supplied at terminal 11 which is shown connected to ground through capacitor C–6 and a resistor R–6. The output signal at terminal 11 will be the desired phase shifted or time positioned signal. As previously indicated, variable delay lines such as DL–4 are commercially available. A similar delay line is employed in FIG. 2.

The relationships between the differences in phase between the input signals to the prase discriminator P–2 and the output voltage of the phase discriminator are illustrated in FIG. 5. It will be recognized in FIG. 5 that regardless of whether the phase difference is greater than or less than 180° a positive potential will be supplied at the output terminal 17 of the phase discriminator P–2 and that a signal of a selected reference value representing the phase difference is exactly 180° will be supplied at point X. The output voltage appearing on terminal 17 is supplied to an amplifier at 16 which may include a cathode follower to serve as an isolator for the circuits and provide a D.C. control voltage to delay line DL–4. The delay line DL–4 is of such a nature that it is responsive over its entire range to positive D.C. voltages as indicated in FIG. 6. At some potential midway between zero and the maximum voltage to which the delay line is responsive, labeled Y in FIG. 6 and corresponding to X in FIG. 5, a reference delay time may be established and deviations above and below that reference value will cause the delay line to increase or decrease its time delay.

Although particular embodiments of my invention have been described above, many modifications of the invention may be made. It is understood that I intend to cover by the appended claims all such modifications as fall within the true spirit and scope of the invention.

What I claim as new and desire to secure by Letters Patent of the United States is:

1. A controller for precisely regulating the time delay of an input signal comprising a source of reference signals having a fixed period, means including a gate circuit in series with parallel channels for transmitting said reference signals from said source to said channels, time delay means including a variable delay line in one of said parallel channels for delaying said reference signals by approximately one fixed period, means in another channel for transmitting said reference signals without delay, a processor for receiving signals from said parallel channels and including means for comparing phase of said signals and generating a control signal proportional to any difference in phase between said signals, means for supplying said control signal to said variable delay line to adjust said time delay to more closely equal said fixed period, and means including said gate circuit responsive to an input signal to stop said reference signals and transmit said input signal to said one channel and through said adjusted delay means therein.

2. A delay time controller comprising means for generating a reference signal having a fixed period, a gate circuit connected to receive and normally to transmit said reference signal, means including a variable delay line for providing a time delay approximately equal to said fixed period, means connecting said delay line to receive said reference signal and deliver a delayed signal to a first terminal, said delayed signal thereby being delayed by a time approximately equal to one fixed period, means for receiving said reference signal and delivering an undelayed signal to a second terminal, discriminator means coupled to said first and second terminals for receiving said delayed signal and said undelayed signal and generating a control signal in accordance with phase relationships between said delayed and said undelayed signals, means for connecting said control signal to said delay line for correcting the time delay to provide a more accurate total time delay, means coupling input signals to said gate circuit to cause said gate circuit to cut-off said reference signals responsive to said input signals, and means coupling said input signals to said delay line to be delayed in time by said corrected time delay.

3. In a time delay circuit, means for adjusting the delay provided by a time delay line including a variable delay element, means for generating reference signals having a fixed period, means for applying said reference signals through said time delay line to provide first output signals delayed by approximately said fixed period, means for applying said reference signals through a circuit to provide undelayed second output signals, means receiving said first and second output signals and operative to compare said output signals and to generate a control signal proportional to the phase relationships between said output signals, means for applying said control signal to said variable delay element to adjust the delay time to a value nearer said fixed period, and means for applying input signals to said time delay line to provide third output signals precisely delayed in time by said fixed period.

4. In a time delay circuit, means for adjusting the delay provided by a time delay line including a variable delay line, means for generating reference signals having a fixed period, means for applying said reference signals through said time delay line to provide first output signals delayed by approximately said fixed period, means for applying said reference signals through a circuit to provide undelayed second output signals, means receiving said first and second output signals and operative to compare said output signals and to generate a control signal proportional to the phase relationships between said output signals, means for applying said control signal to said variable delay line to adjust the delay time to a value nearer said fixed period, means for applying input signals to said time delay line to provide third output signals precisely delayed in time by said fixed period, and including suitable filters for separating said third output signals from said first output signals.

5. A time delay circuit substantially as claimed in claim 4 in which the reference signals and the input signals are separated in frequency and the filters are band pass filters having bandwidths corresponding to the reference and input signal frequencies, respectively.

6. A controller for precisely regulating the time delay of an input signal comprising a source of reference signals having a fixed period, means including a gate circuit in series with parallel channels for transmitting said reference signals from said source to said channels, time delay means including a variable delay line in one of said parallel channels for delaying said reference signals by approximately one fixed period, means in another channel for transmitting said reference signals without delay, a processor for receiving signals from said parallel channels including means for comparing phase of said signals and generating a control signal proportional to any difference in phase between said signals, means for supplying said control signal to said variable delay line to adjust said time delay to more closely equal said fixed period, an input terminal for receiving an input signal to be processed, means for coupling said input signal from said input terminal to the one of said parallel channels containing said delay line, means for coupling said input signal from said input terminal to said gate circuit, said gate circuit responding to said input signal to stop the flow of reference signals into said parallel channels, said input signal thereby passing through said delay line to be delayed by said adjusted time delay.

7. A delay time correcting circuit comprising means for generating reference signals of a fixed period and applying them through a normally conductive gate circuit to parallel channels, said gate circuit being responsive to an input signal to inhibit the flow of the reference signals into said parallel channels, means including a variable delay line in a first one of said parallel channels for providing a time delay approximately equal to said fixed period, means in a second one of said parallel channels to provide substantially no time delay, phase discriminator means receiving signals from said first and second parallel channels and including means for generating a control signal proportional to the phase relationships between signals from said first and said second parallel channels, means for utilizing said control signal to adjust the variable delay line to provide a corrected time delay more nearly equal to said fixed period, means for receiving an input signal to be processed and applying it to said gate to inhibit the flow of the reference signals into the parallel channels, and means for applying said input signals through the delay line to impart to it the corrected time delay.

References Cited by the Examiner

UNITED STATES PATENTS 2,883,536 4/59 Salisbury et al. ------- 328—155

ARTHUR GAUSS, *Primary Examiner.*

UNITED STATES PATENT OFFICE
CERTIFICATE OF CORRECTION

Patent No. 3,206,686 September 14, 1965

Dan Goor

It is hereby certified that error appears in the above numbered patent requiring correction and that the said Letters Patent should read as corrected below.

Column 6, line 45, after "and" insert -- means --; line 62, after "channels" insert -- and --.

Signed and sealed this 15th day of March 1966.

(SEAL)
Attest:

ERNEST W. SWIDER
Attesting Officer

EDWARD J. BRENNER
Commissioner of Patents